A. M. HIRSH.
JOINT FOR CONCRETE PIPES.
APPLICATION FILED AUG. 11, 1916.

1,231,607.

Patented July 3, 1917.

Inventor
Allan M. Hirsh
By his Attorneys
Kerr Page Cooper & Hayward

UNITED STATES PATENT OFFICE.

ALLAN M. HIRSH, OF MONTCLAIR, NEW JERSEY.

JOINT FOR CONCRETE PIPES.

1,231,607. Specification of Letters Patent. Patented July 3, 1917.

Application filed August 11, 1916. Serial No. 114,346.

*To all whom it may concern:*

Be it known that I, ALLAN M. HIRSH, a citizen of the United States, residing at Montclair, in the county of Essex and State of New Jersey, have invented certain new and useful Improvements in Joints for Concrete Pipes, of which the following is a full, clear, and exact description.

One of the most difficult engineering problems encountered in the construction of concrete pipes designed to sustain the pressure of a head of water is to devise a form of joint which will compensate for the inevitable cracking between pipe sections due to expansion and contraction, and which at the same time will remain perfectly water-tight.

It has been found that no matter what kind of joint be used, or how carefully it be made, the cracks which must occur between two sections of pipe, due to changes of temperature in the surrounding medium or in the body of water flowing through the pipe, permit the escape as leakage of a prohibitively large amount of water, although the cracks themselves may be too small to be visible to the naked eye.

I have devised and employed with complete success, a form of joint for such pipes which is absolutely watertight, such joint involving in one of its specific forms a cylinder of metal uniting two adjacent pipe sections with a crimp or fold therein which lies along the face or faces of the ends of the sections, and this cylinder is covered or embedded in cement partly or wholly applied to complete the joint. In this case the capability of the metal itself for longitudinal expansion and contraction enables it to adjust itself to any slight variations in the spacing of adjacent pipe sections, and as a good union is always preserved between it and the cement, no water can pass it even if cracks do occur at the joint.

I have now devised another form of joint in which the water-tight properties are maintained by means of a cylinder of sheet metal, but in lieu of making the cylinder capable of longitudinally expanding or contracting, I use a substantially non expansible cylinder, but unite it to at least one pipe section by a slightly elastic body or mass of material, adherent to both the pipe section and the cylinder, and which, in case of a crack occurring at the joint, will permit of a slight separation of the adjacent pipe sections without impairing the water-tight nature of the joint as a whole.

In carrying out my invention, I prefer to use the form of pipe which I manufacture for commercial purposes, and which has a bell end with exterior flanges somewhat longer than the spigot so that an interior recess is formed between two abutting pipe sections which is filled with cement after the pipe is laid. In the spigot end of each section of this pipe I form a circular groove or relatively narrow recess, preferably having a metal lining which extends out beyond the end of the pipe. When laying the pipe I fill this recess with a plastic material such as warm asphalt and force the end of a sheet metal cylinder down into the asphalt. The other end of the cylinder, which may be corrugated, will therefore extend out into the interior recess or space between pipe sections, and when this is filled up with cement, the latter is firmly united to the bell end of the pipe and to the projecting metal cylinder.

I prefer also to paint the spigot end of the pipe and the exterior walls of the projecting lining for the groove with asphalt, and to employ the usual metal reinforcements through and between the several pipe sections as in the ordinary course of manufacture.

When cracks occur in this joint they invariably form along the spigot end or close to it, but by the use of the metal cylinder embedded in the slightly elastic mass of asphalt the absolutely water-tight character of the joint is maintained in spite of any cracks that may occur.

The modifications of this plan which still retain this principle of construction and operation will be understood from the specific description and illustrations which follow.

Figure 1:
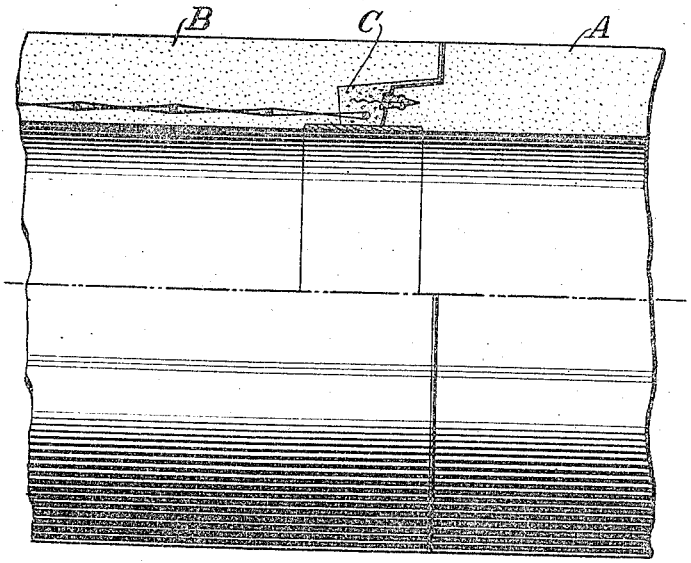
Figure 1 is a sectional view of a well known form of pipe with my present invention applied thereto.
Figure 2:
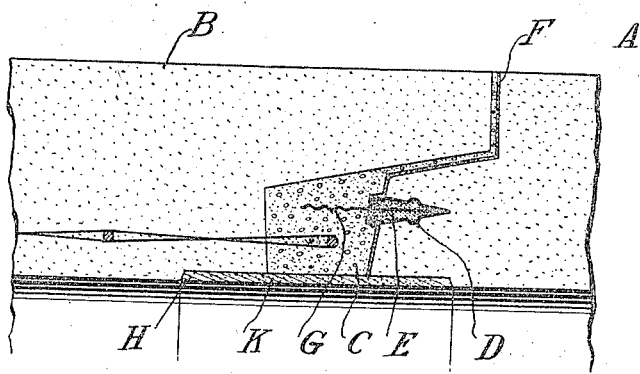
Fig. 2 is an enlarged sectional view of the improved joint showing the construction more in detail.

As a general illustration of the nature of the improvement, its application to the form of pipe shown in Figs. 1 and 2 may be considered first. In these figures A and B represent, respectively, the spigot and bell ends of the pipe, the spigot being somewhat shorter than the bell to form an interior groove or recess at the joint, which, after the pipe sections are laid, is filled in with a mass of cement C. In using this particular form of pipe for purposes of illustration it will be understood that there is no intention of confining the improvement thereto.

In forming the spigot end a circular metal form D substantially V-shaped in cross section is let into the mold and the concrete packed around it, the open end of the metal part being allowed to project slightly beyond the end of the spigot. The metal form, it may be stated, can be withdrawn or dispensed with, if so desired, and a simple groove or recess formed in the concrete, but I prefer to retain it. On the completion of a section the metal groove or form is filled with plastic asphalt E, or any similar composition which has the property of adhering to a metal surface and which will always exhibit a slight degree of elasticity, and into this body of elastic material the end of a cylinder of sheet metal G, preferably copper, is forced.

When two pipe sections are joined, the outer end of this cylinder projects into the groove or space between the sections, and this end may be corrugated and by preference is formed in this way. When the groove or recess is filled with grout or cement C the pipe sections are firmly united and the end of the copper cylinder G embedded in the cement.

To further insure a good joint a shallow recess H is formed at the ends of the sections and the cement filler C is covered by a filling K applied in this recess by a trowel, and composed of a mixture of very finely sifted neat cement and water. I also prefer to paint the ends of the spigot section and the exterior surface of the metal form D with asphalt, which is represented by the character 5.

When cracks occur in such pipe joints they invariably lie along or close to the spigot end, but the presence of the copper cylinder embedded in the cement at one end and the asphalt at the other, effectually prevents any leakage, while the elasticity of the asphalt compensates for any cracks that may occur without stripping the adherent material from the copper.

Figure 3:
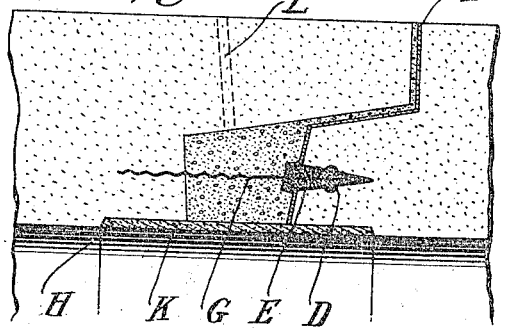
Fig. 3 is another sectional view of a different form of modification.

As a modification of this form of joint, the corrugated end of the copper cylinder may be embedded in the bell end of a section and the other end forced into the groove of asphalt in the spigot; as shown in Fig. 3. In such case the recess or space between the flange of the bell and the copper cylinder may be filled with grout or cement through a perforation L formed through the bell flange.

Figure 4:
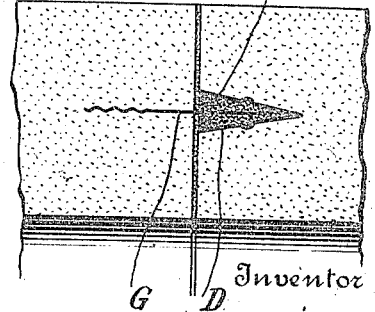
Fig. 4 is a sectional view of a further modification embodying the invention.

The general principle of the joint is shown in Fig. 4. In this case the pipe has flat ends and forms an ordinary butt joint. The corrugated end of the copper cylinder may be embedded in the end of one pipe section and forced into the asphalt in a circular groove in the adjacent section, as shown. In such form of joint it is obvious that the edges of the metal form, when used, must be flush with the face of the section in which it is embedded.

I am aware that it has been proposed to form pipe joints with metal cylinders, the ends of which are embedded in masses of cement introduced into suitable recesses in adjacent pipe sections, but in no previous case has it apparently been recognized that expansion and contraction varies, even slightly the distance between pipe sections by the presence of cracks, and that no form of joint is effective to prevent leakage under pressure, unless adequate provision is made for compensation for such variation.

What I therefore claim is:

1. A water tight joint for concrete pressure pipes composed of cement and having a metal cylinder passing into or through the same, a mass of elastic sealing material such as asphalt uniting said cylinder to one pipe section, said section having an annular groove therein containing the said mass, which is adapted to compensate for cracks which may occur in the cement of the main joint.

2. A water tight joint for concrete pressure pipes composed of cement and having a sheet metal cylinder embedded in the same, a mass of adhesive elastic sealing material such as asphalt into which one end of the cylinder extends, and an annular groove or recess in the end of one of the abutting pipe sections in which such mass of sealing material is contained.

3. A water-tight concrete pressure pipe, comprising sections with bell and spigot ends formed to leave a recess or groove between abutting sections when laid, grooves filled with an elastic adhesive material formed in the spigot end, and sheet metal cylinders forced into the elastic material at one end and embedded in a cement filler for the joint recess at the other.

4. A water-tight joint for concrete pressure pipes, comprising a circular recess in the end of one abutting section, a filling of adhesive elastic material for the same and a sheet metal cylinder embedded in the elastic material and united to the concrete of the other section by a cement joint.

5. A water-tight joint for concrete pressure pipes, comprising a circular recess in the end of one abutting section, a metal lining therefor and a filling for the lining of an adhesive elastic material, a metal cylinder embedded in the filler of elastic material and united by a cement or concrete joint to the other section.

6. A water-tight joint for concrete pressure pipes, formed between abutting pipe sections having bell and spigot ends of unequal length so as to form a recess around the joint, a circular groove in the end of one section, a metal lining therefor, the ends of which extend beyond the face or end of the pipe section, a filling of elastic material such as asphalt for the lining, and a metal cylinder embedded at one end in such filling and at the other in the cement filling for the joint.

In testimony whereof I affix my signature.

ALLAN M. HIRSH.